US009316187B2

(12) United States Patent
Saler et al.

(10) Patent No.: US 9,316,187 B2
(45) Date of Patent: Apr. 19, 2016

(54) DIESEL FUEL SYSTEM WITH ADVANCED PRIMING

(75) Inventors: John Lee Saler, Westfield, IN (US); Kyle Dean Achor, Monticello, IN (US)

(73) Assignee: Carter Fuel Systems, LLC, Cleveland, OH (US)

(*) Notice: Subject to any disclaimer, the term of this patent is extended or adjusted under 35 U.S.C. 154(b) by 177 days.

(21) Appl. No.: 13/008,696

(22) Filed: Jan. 18, 2011

(65) Prior Publication Data

US 2012/0180765 A1 Jul. 19, 2012

(51) Int. Cl.

| | |
|---|---|
| ***F02M 37/20*** | (2006.01) |
| ***B01D 35/147*** | (2006.01) |
| ***F02M 9/10*** | (2006.01) |
| ***F02M 37/00*** | (2006.01) |
| *F02M 37/22* | (2006.01) |

(52) U.S. Cl.

CPC .......... *F02M 37/0052* (2013.01); *F02M 37/20* (2013.01); *F02M 37/22* (2013.01)

(58) Field of Classification Search

CPC .......... F02M 37/0023; F02M 37/0029; F02M 37/0052; F02M 37/20; F02M 63/0042; F02M 55/00; F02M 55/007

USPC ............ 123/510, 514, 516, 511, 179.17, 457, 123/459, 461, 179.12, 179.15, 179.9; 137/494, 508, 509, 538, 906; 251/63.5

See application file for complete search history.

(56) References Cited

U.S. PATENT DOCUMENTS

| | | | | | |
|---|---|---|---|---|---|
| 3,744,508 | A | * | 7/1973 | Hansen et al. | 137/116.3 |
| 4,427,542 | A | * | 1/1984 | Glover | 210/121 |
| 4,440,138 | A | | 4/1984 | Smith | |
| 4,878,474 | A | | 11/1989 | Hack, Jr. | |
| 4,984,554 | A | | 1/1991 | Ariga et al. | |
| 5,095,880 | A | | 3/1992 | Ricks | |
| 5,394,844 | A | * | 3/1995 | Akimoto | 123/179.3 |
| 5,598,817 | A | * | 2/1997 | Igarashi et al. | 123/179.17 |
| 5,699,772 | A | * | 12/1997 | Yonekawa et al. | 123/497 |
| RE36,119 | E | * | 3/1999 | Kunishima et al. | 123/516 |
| 5,878,718 | A | * | 3/1999 | Rembold et al. | 123/456 |
| 5,918,578 | A | * | 7/1999 | Oda | 123/456 |
| 6,021,763 | A | | 2/2000 | Yoshihara et al. | |
| 6,058,912 | A | * | 5/2000 | Rembold et al. | 123/516 |
| 6,068,022 | A | * | 5/2000 | Schultz et al. | 137/538 |
| 6,159,383 | A | * | 12/2000 | Gullett et al. | 210/741 |

(Continued)

FOREIGN PATENT DOCUMENTS

| | | | | |
|---|---|---|---|---|
| DE | 19933198 | A1 | * | 1/2001 |
| EP | 1326020 | A2 | | 7/2003 |

(Continued)

OTHER PUBLICATIONS

International Search Report PCT/US2012/021652 mailed May 7, 2012.

*Primary Examiner* — Mahmoud Gimie
*Assistant Examiner* — John Zaleskas
(74) *Attorney, Agent, or Firm* — Jones Day

(57) ABSTRACT

This invention relates to an aerating device for a fuel system, and in particular, to an aerating device for a fuel system supplying fuel to an engine from a fuel tank. The invention includes, for example, a solenoid valve accessing a flow path to the fuel tank, and a control unit opening a closing the solenoid valve, such that opening of the solenoid valve permits fuel and air to flow back through the flow path to the fuel tank and naturally separate.

8 Claims, 6 Drawing Sheets

(56) References Cited

U.S. PATENT DOCUMENTS

| | | | | |
|---|---|---|---|---|
| 6,269,801 | B1 * | 8/2001 | Channing | 123/516 |
| 6,289,879 | B1 * | 9/2001 | Clausen et al. | 123/516 |
| 6,345,608 | B1 * | 2/2002 | Rembold et al. | 123/506 |
| 6,520,162 | B1 * | 2/2003 | Schueler | 123/510 |
| 6,615,807 | B2 | 9/2003 | Rembold et al. | |
| 6,622,708 | B2 * | 9/2003 | Braun et al. | 123/516 |
| 6,729,310 | B2 * | 5/2004 | Ekstam | 123/516 |
| 6,755,625 | B2 * | 6/2004 | Breeden | 417/298 |
| 6,769,414 | B2 | 8/2004 | Rembold et al. | |
| 6,792,915 | B2 * | 9/2004 | Rembold et al. | 123/446 |
| 6,817,343 | B1 * | 11/2004 | Greco et al. | 123/497 |
| 6,918,409 | B1 | 7/2005 | Parker | |
| 6,923,159 | B2 * | 8/2005 | Sakumoto et al. | 123/446 |
| 6,971,374 | B2 | 12/2005 | Saito | |
| 7,431,021 | B1 | 10/2008 | Achor | |
| 7,448,361 | B1 * | 11/2008 | Pursifull et al. | 123/456 |
| 7,634,986 | B2 * | 12/2009 | Kuroda et al. | 123/457 |
| 7,640,919 | B1 * | 1/2010 | Smith | 123/511 |
| 2002/0124834 | A1 * | 9/2002 | Rembold et al. | 123/514 |
| 2003/0188716 | A1 * | 10/2003 | Grossner et al. | 123/447 |
| 2005/0241622 | A1 * | 11/2005 | Dickerson | 123/510 |
| 2006/0075993 | A1 * | 4/2006 | Kuroda | 123/457 |
| 2006/0231080 | A1 * | 10/2006 | Tomatsuri et al. | 123/516 |
| 2007/0272212 | A1 * | 11/2007 | Aoki et al. | 123/445 |
| 2007/0272217 | A1 * | 11/2007 | Kubota et al. | 123/495 |
| 2008/0035121 | A1 * | 2/2008 | Wieczorek | 123/516 |
| 2009/0013972 | A1 * | 1/2009 | Wilson et al. | 123/514 |
| 2009/0107471 | A1 * | 4/2009 | Ikeya | 123/511 |
| 2009/0145402 | A1 * | 6/2009 | Sano | 123/447 |
| 2009/0151703 | A1 * | 6/2009 | Ikeya | 123/506 |
| 2009/0211559 | A1 * | 8/2009 | Appleton et al. | 123/511 |
| 2010/0212641 | A1 * | 8/2010 | Kawashima et al. | 123/516 |

FOREIGN PATENT DOCUMENTS

| | | | | | |
|---|---|---|---|---|---|
| EP | 1338787 | A1 | * | 8/2003 | |
| EP | 2180174 | A1 | | 4/2010 | |
| JP | 2000352365 | A | * | 12/2000 | F02M 37/08 |
| JP | 2006200423 | A | * | 8/2006 | |
| JP | 2010169069 | A | * | 8/2010 | |
| WO | WO 2008017547 | A1 | * | 2/2008 | |
| WO | WO 2008148598 | A1 | * | 12/2008 | |

* cited by examiner

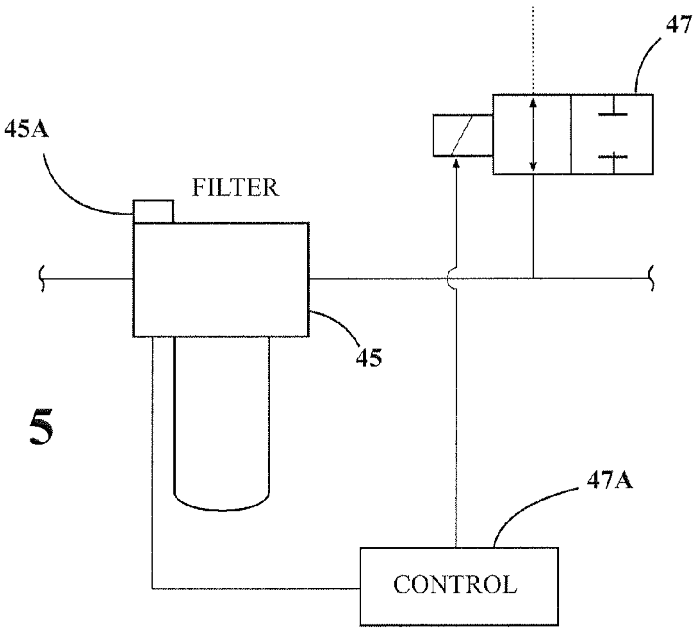
FIG. 5
FIG. 7
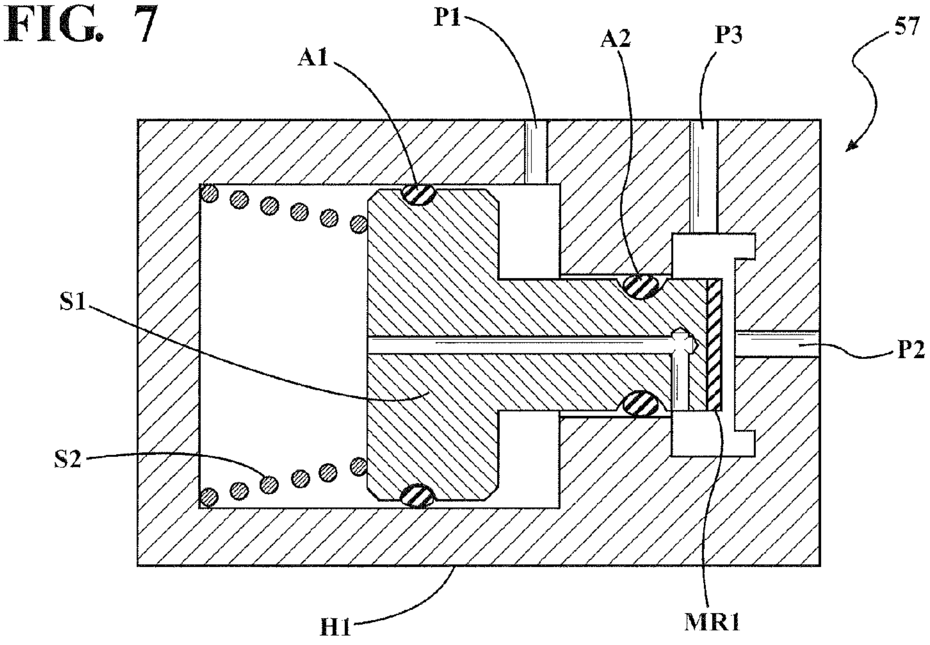

DIESEL FUEL SYSTEM WITH ADVANCED PRIMING

TECHNICAL FIELD

This invention relates generally to an aerating device for a fuel system, and in particular, to an aerating device for a fuel system supplying fuel to an engine from a fuel tank.

BACKGROUND OF THE INVENTION

In many existing engine applications it is difficult to rapidly prime (eliminate air from) the fuel system, especially after fuel system maintenance, such as a fuel filter change. This is often due to the inherently high restriction of mechanically driven pumps when the engine is not running. Fixed orifices are used to provide a flow path around the restrictive component. However, since these orifices tend to be small or have check valves to prevent leakage through the system, the orifices can waste power in normal engine operation, and still not reduce the restriction enough for efficient priming. Other alternatives include manually opening the fuel system by loosening a fitting or opening a bleed screw to allow aerated fuel to escape. However, this method is both messy and labor intensive.

FIG. 1 is a schematic diagram of a fuel priming system used in the conventional art. Such a fuel priming system 1 may include, for example, a fuel tank 2 in which fuel is pumped to an engine through the fuel rail 9 to injectors. The fuel passes through a pre-filter 3 to a priming pump 4 which compresses air pockets in the system during the prime cycle. Fuel then passes to a secondary fuel filter 5, and onward to high pressure pump assembly 6. High pressure pump assembly 6 includes check valves and bleed orifices 7 that allow air pressure in the system to be vented. However, such valves and orifices require the system to generate enough air pressure to open the valves and result in internal leakage in the system, even if a low pressure drain line 8 is fed back to the fuel tank 2.

U.S. Pat. No. 7,431,021 discloses a fuel vapor separator in a fuel delivery system of a marine engine. With reference to FIG. 2, an engine (not shown) draws liquid fuel from a fuel tank 20. A low pressure fuel supply pump 26 or lift pump typically pulls fuel from the tank 20 through a supply line 24. The fuel is delivered to a vapor separator 28, which collects and discharges vapors given off due to incoming low fuel pressure, normal vaporization of fuel, etc. High pressure pump 30 may be connected to the vapor separator 28 and pumps the fuel under pressure to the cylinders of the engine, such as through a fuel injector system 32. Unused fuel is returned to the vapor separator 28 via return line 34. The vapor separator 28 includes a vent device 36 to vent fuel vapors into the engine through its air intake.

SUMMARY OF THE INVENTION

This invention relates to an aerating device for a fuel system, and in particular, to an aerating device for a fuel system supplying fuel to an engine from a fuel tank. One aspect of the present invention includes a solenoid valve accessing a flow path to the fuel tank and a control unit for opening a closing the solenoid valve such that opening of the solenoid valve permits fuel and air to flow back through the flow path to the fuel tank and naturally separate.

In one embodiment, there is an aerating device for a fuel system supplying fuel to an engine from a fuel tank includes a flow path coupled to the fuel tank, a valve accessing the flow path to the fuel tank and a control unit for controlling the valve. The control unit selectively opens the valve to permit fuel and air to flow back through the flow path to the fuel tank for separation from one another.

In one aspect, the device further includes a fuel filter for receiving fuel from a fuel tank via a priming pump and a high pressure pump assembly for providing fuel to a fuel rail of the engine. The valve is located between the fuel filter and the high pressure pump assembly, and the flow path extends between the valve and the fuel tank.

In another aspect, the control unit is one of a switch, control module and engine control computer.

In yet another aspect, the valve is one of a solenoid valve and spool-type valve.

In still another aspect, the spool-type valve comprises a housing, a movable spool and a spring with an integrally-molded disc such that hydraulic pressure in the housing causes the spool to move, thereby allowing air in the fuel system to aerate.

In another aspect, the engine is a diesel engine.

In another embodiment, there is an aerating device for a fuel system supplying fuel to an engine from a fuel tank, including a fuel sensor to detect a ratio of fuel to air; a valve to aerate the fuel system; and a control unit controlling the valve based on the detected ratio from the fuel sensor, wherein controlling the valve to open enables the system to be primed.

In still another embodiment, there is a method of aerating a fuel system supplying fuel to an engine from a fuel tank, including accessing a flow path using a valve, the flow path coupled to the fuel tank; controlling the valve such that opening of the valve permits fuel and air to flow back to the fuel tank; and separating air and fuel in the fuel tank.

BRIEF DESCRIPTION OF THE DRAWINGS

These and other features and advantages of this invention will become more apparent to those skilled in the art from the detailed description of a preferred embodiment. The drawings that accompany the detailed description are described below:

FIG. 5 is an enlarged and fragmentary diagram of the automatic priming system of FIG. 4;

FIG. 7 is an enlarged diagram of the an exemplary spool-type valve of FIG. 6.

DETAILED DESCRIPTION OF A PREFERRED EMBODIMENT

Figure 1:
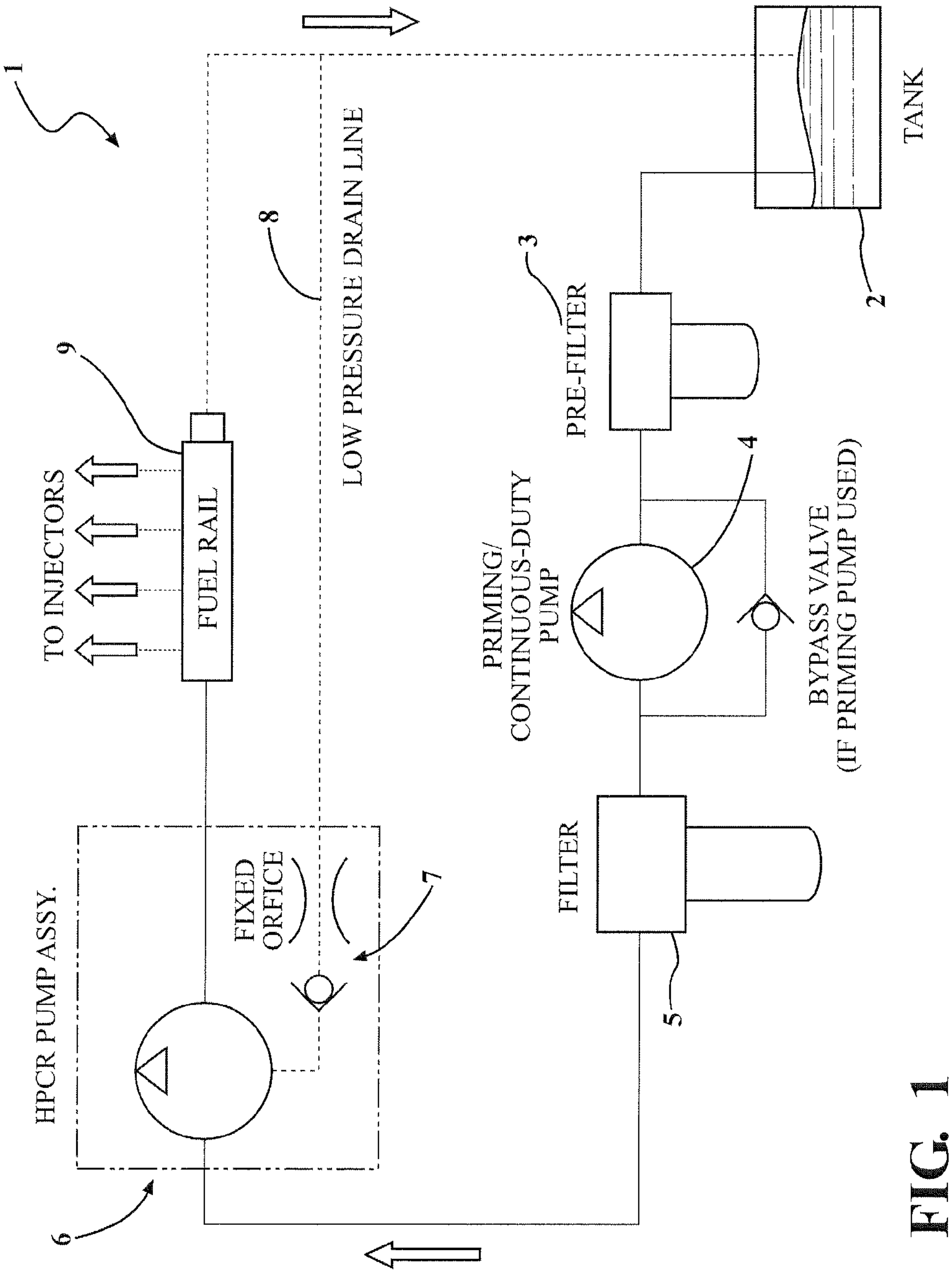
FIG. 1 PRIOR ART
FIG. 1 is a schematic diagram of a known fuel priming system.
Figure 2:
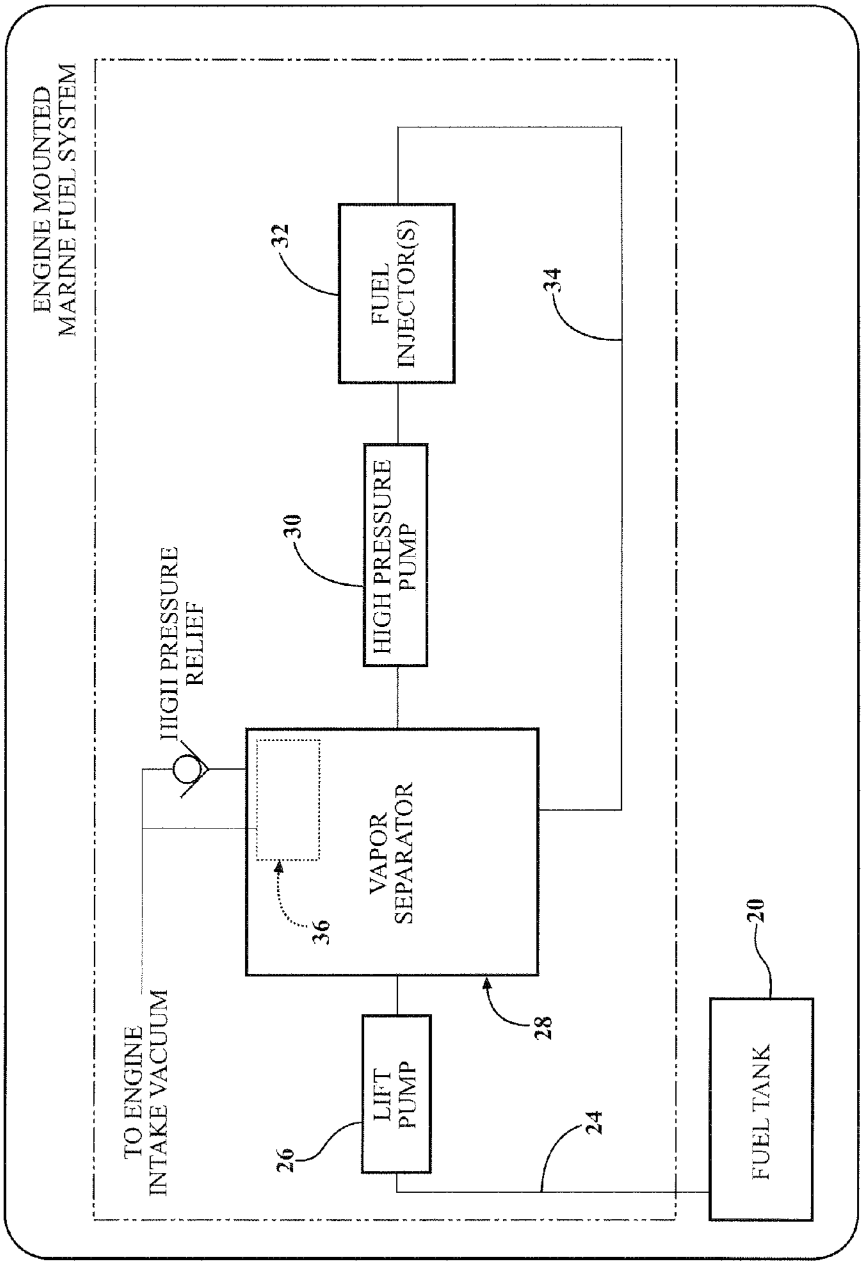
FIG. 2 PRIOR ART
FIG. 2 is a schematic diagram of a known fuel delivery system.
Figure 3:
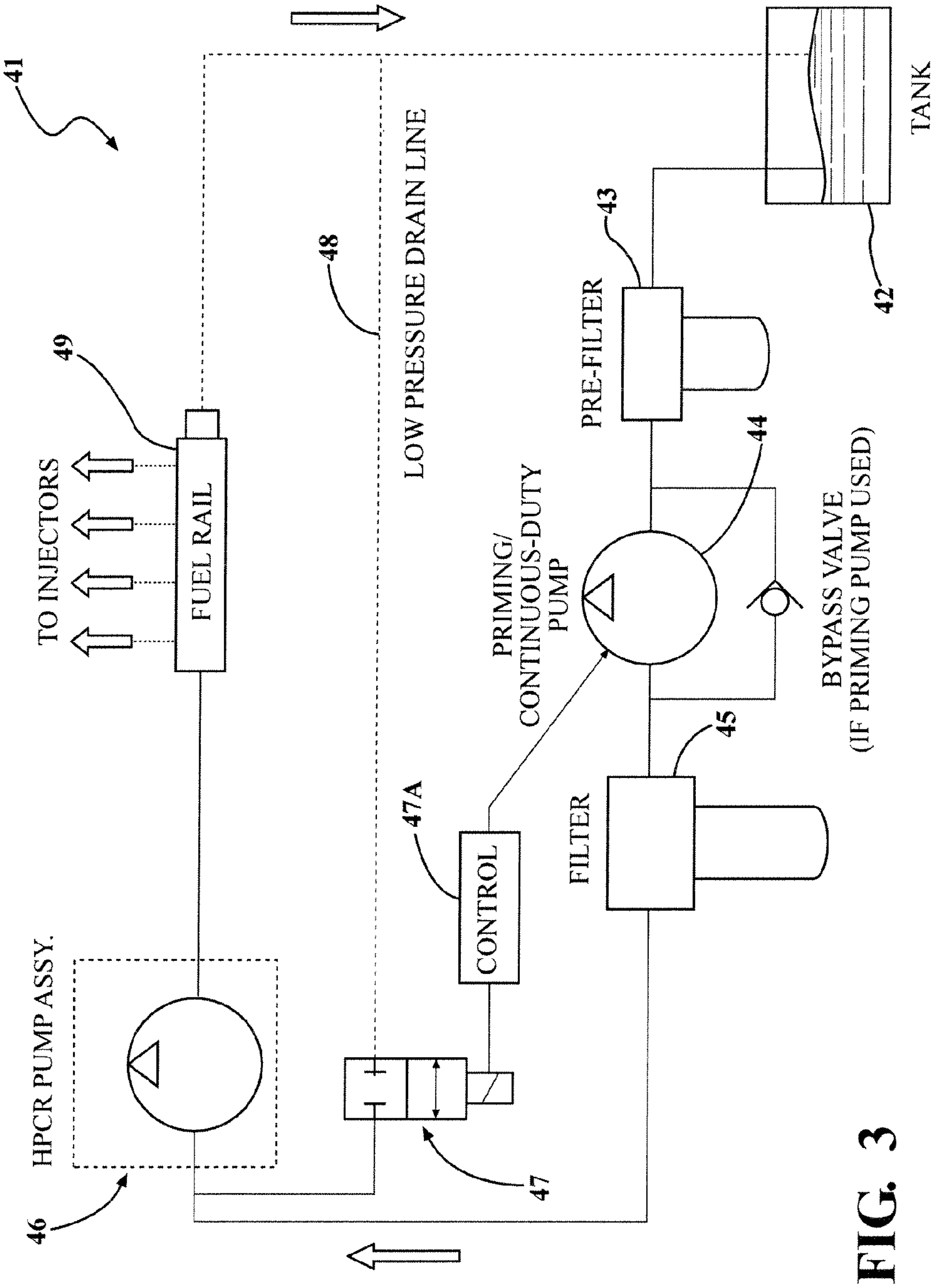
FIG. 3 is a schematic diagram of a fuel priming system with a solenoid valve constructed in accordance with one embodiment of the present invention.

At least one aspect of the present invention incorporates a low restriction flow path back to the fuel tank where fuel and air can separate naturally. The flow path is incorporated into the existing circuit before the point of high restriction. This flow path can be opened and closed, in one embodiment, by a solenoid valve producing an efficient priming system with less mess and labor. In another embodiment, the added flow path can be opened and closed by a spool-type valve when an electric priming pump is energized. A fuel sensor may be used to detect when fuel is present in the system. If no fuel is detected, the system assumes air is in the system and vents the air using the flow path. An additional advantage is that the power-wasting fixed orifice is no longer needed to assist with priming. FIG. 3 is a schematic diagram of a fuel priming system 41 with a solenoid valve constructed in accordance with one aspect of the invention. Such a fuel priming system 41 may include, for example, a fuel tank 42 from which fuel is pumped to an engine through the fuel rail 49 to the injectors. Before being delivered to the injectors, the fuel passes through a pre-filter 43 to a priming pump 44 which compresses air pockets in the system 41 during a priming cycle. Fuel then passes to a secondary fuel filter 45, and ultimately to high pressure pump assembly 46. Unlike the conventional system described above and shown in FIG. 1, this embodiment of the invention includes a valve (for example, a solenoid valve 47 or spool-type valve) placed in the system just prior to the high pressure pump assembly 46. In this embodiment, the solenoid valve 47 provides access to a low restriction flow path 48, which leads back to the fuel tank where fuel and air can naturally separate from one another. The flow path 48 is opened and closed by the solenoid valve, and the result is an efficient priming system 41 which may have less mess and labor than other known priming systems. The solenoid valve 47 can be controlled manually with a switch, automatically with a control module 47A or automatically with the existing engine/chassis control computer (i.e. the solenoid valve 47 can be controlled by the vehicle's engine control module or a separate control module).

Figure 4:
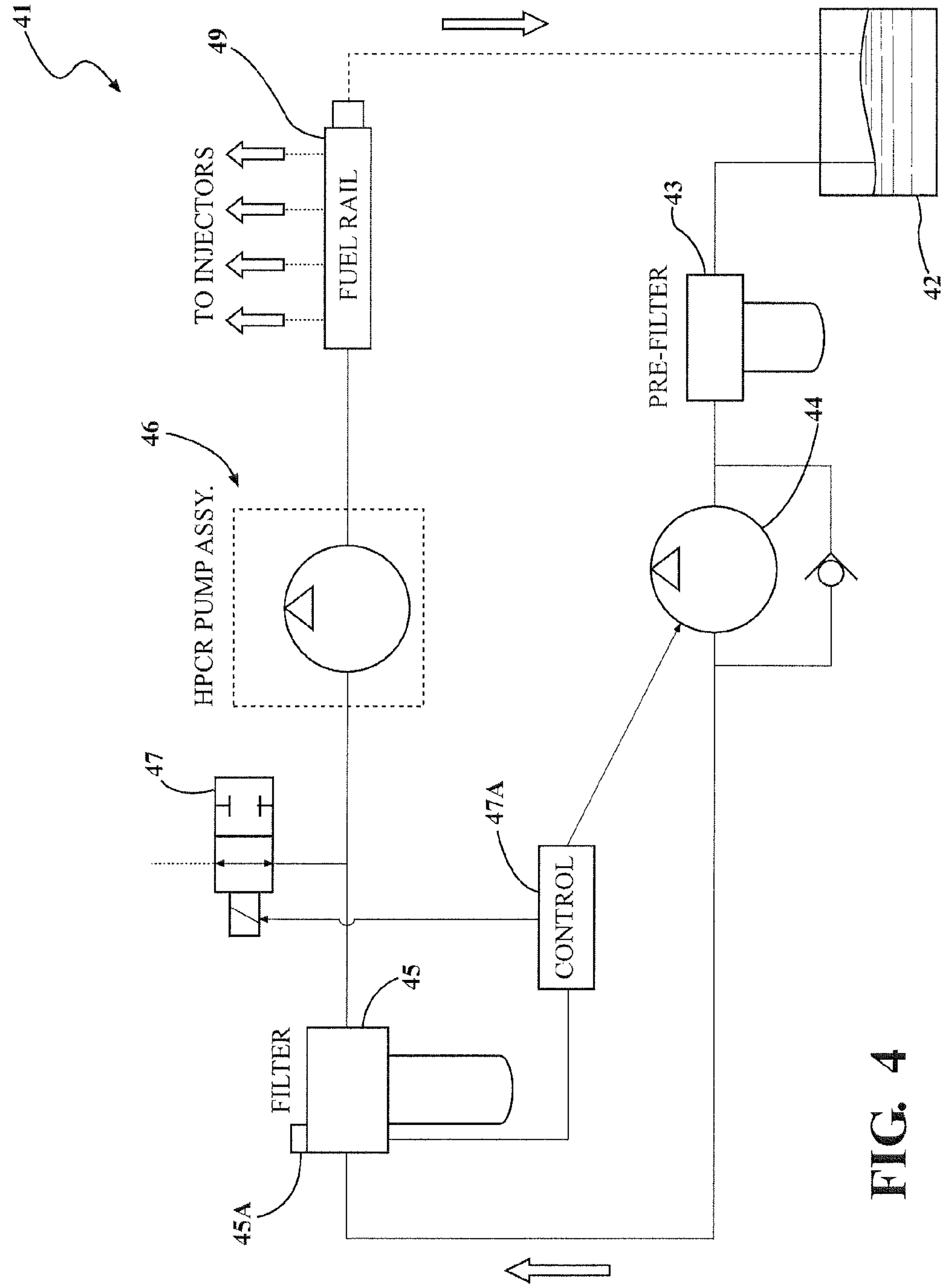
FIG. 4 is a schematic diagram of a fuel priming system with a solenoid valve and fuel sensor constructed in accordance with one embodiment of the present invention.

Referring now to FIG. 4, which shows a fuel priming system 41 constructed according to an alternate aspect of the invention, the fuel priming system 41 includes a fuel sensor 45A for detecting whether fuel and/or air is present in the system. The fuel sensor 45A may be included in the filter 45 (as shown) or provided as a stand alone assembly (not shown). The fuel priming system 41 of FIG. 4 is similar to the system shown in FIG. 3, but does not require a return path back to the fuel tank. Rather, the embodiment of FIG. 4 uses the fuel sensor 45A to detect a ratio of fuel to air in the filter 45, and based on the detection, the system is automatically primed by opening and closing the solenoid valve 47 to automatically release any air into the atmosphere. Specifically, as illustrated in FIG. 5, fuel filter 45 includes a fuel sensor 45A to detect fuel in the filter 45. If the fuel sensor 45A detects fuel in the fuel filter 45, then the system is primed and the controller 47A keeps the solenoid valve 47 closed and shuts the priming pump 44 off. If, on the other hand, the fuel sensor 45A detects air in the system (in one embodiment, if fuel is not detected, then air may be present), then the controller 47A opens the solenoid valve 47 and turns on the priming pump 44 to purge the air out of the fuel priming system 41 via solenoid valve 47. When the fuel sensor 45A detects the presence of fuel in the fuel filter 45, the controller 47A closes the solenoid valve 47 and turns off the priming pump 44. This aspect of the invention is beneficial because it may result in a reduction of priming time by as much as 80% compared to conventional techniques.

Figure 6:
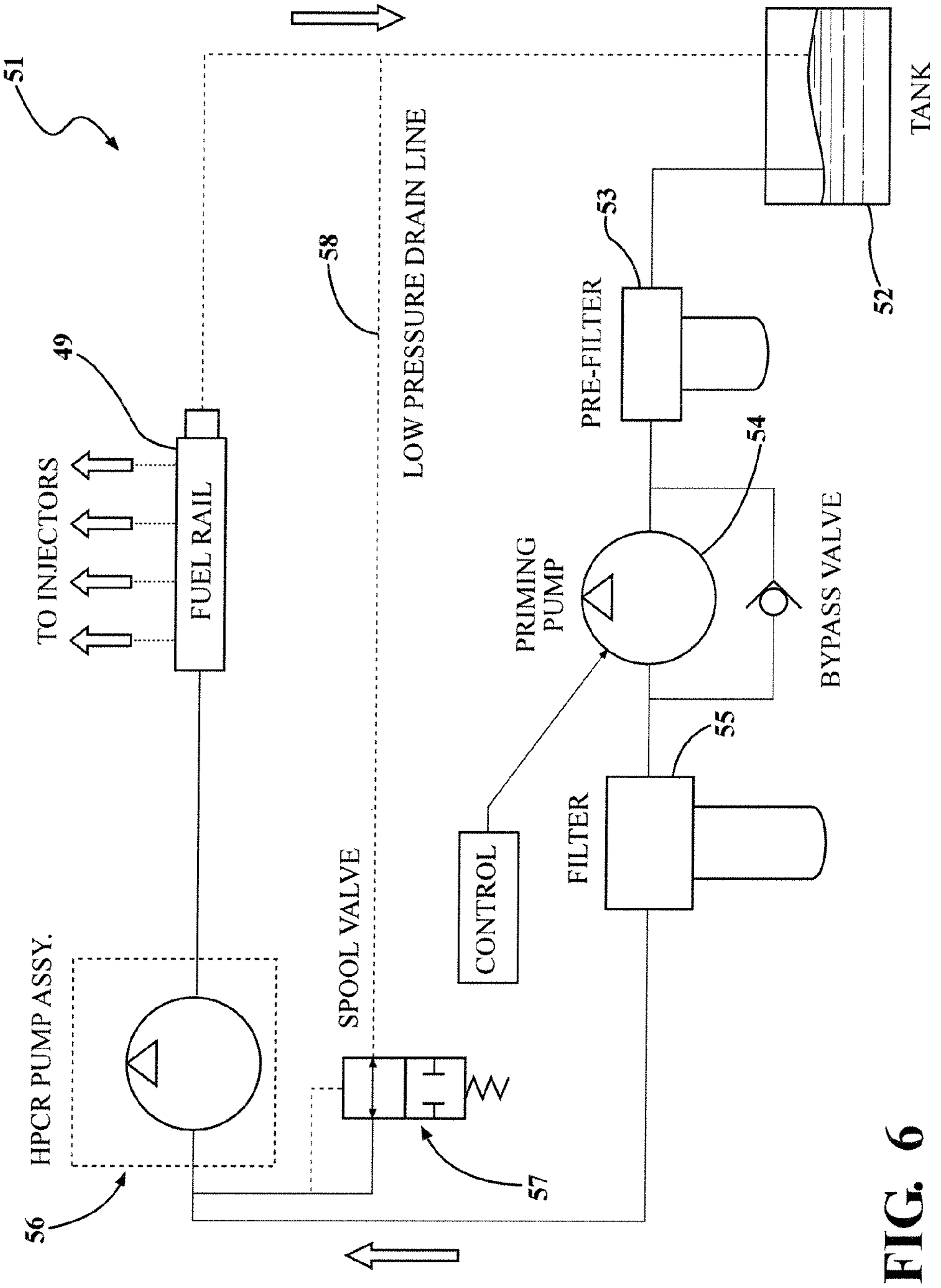
FIG. 6 is a schematic diagram of a fuel priming system with a spool-type valve constructed in accordance with one embodiment of the present invention.

Referring now to FIG. 6, a schematic diagram of a fuel priming system 51 constructed according to yet another aspect of the invention and having a spool-type valve 57 is shown. Such a fuel priming system 51 may include, for example, a fuel tank 52 from which fuel is pumped to an engine through the fuel rail 59 to injectors. The fuel passes through a pre-filter 53 to a priming pump 54 which compresses air pockets in the system during the prime cycle. Fuel then passes to a secondary fuel filter 55 and ultimately to high pressure pump assembly 56. Unlike the conventional system described above and shown in FIG. 1, this embodiment of the invention includes a spool-type valve 57 (described below) placed in the system just prior to the high pressure pump assembly 56. The spool-type valve 57 accesses a low pressure drain line 58 leading back to the fuel tank 52 where fuel and air can naturally separate from one another. The flow path 58 is opened and closed by the spool-type valve 57, thereby producing an efficient priming system with less mess and labor than other known priming systems. As will be discussed in further detail below, the spool-type valve 57 is automatically actuated by fuel pressure when the priming pump 54 is energized. When the priming pump 54 is de-energized, a spring in the spool-type valve 57 returns it to its original resting position, thereby closing off the additional flow path.

FIG. 7 is an enlarged diagram of an exemplary spool-type valve 57 for use in accordance with the embodiment shown in FIG. 6 and discussed above. The spool-type valve 57 includes, for example, a movable spool or poppet S1 with an integrally-molded rubber disc MR1, a spring S2 and housing H1. In the closed (or "at rest") position, the spring S2 holds the spool S1 to the right such that it does not allow hydraulic communication (flow) between ports P3 and P2. As the hydraulic pressure of port P1 increases, a force imbalance builds up and eventually causes the spool S1 to shift to the left (open), which then allows hydraulic communication (flow) between ports P3 and P2. This occurs since the hydraulic pressure from port P1 acts on surface area A1, which is larger than area A2. The design can be made to be relatively insensitive to the magnitude of the hydraulic pressure at P2 with proper selection of the sealing areas. It should be noted that the spool S1 is shown with a series of drillings which communicate the fluid pressure of P3 to the back side (spring chamber area) or the spool S1.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An apparatus comprising:

a priming pump;

a first fuel line configured to channel fuel from a fuel tank to the priming pump;

a high pressure pump configured to pump fuel to an engine;

a second fuel line configured to channel the fuel from the priming pump to the high pressure pump;

a fuel filter in the second fuel line;

a fuel sensor that is included in the fuel filter and is configured to sense presence of fuel in the second fuel line;

a controller configured to:

activate the priming pump in response to the fuel sensor not sensing fuel in the second fuel line, to cause an increased pressure in the second fuel line, and deactivate the priming pump in response to the fuel sensor sensing fuel in the second fuel line, to cause a decreased pressure in the second fuel line; and a valve connected to the second fuel line, the valve being configured to:

open in response to the increased pressure caused by the activating of the priming pump, to release air from the second fuel line to outside the apparatus to avoid the air, released by the valve, from entering the high pressure pump, the engine and the fuel tank, and close in response to the decreased pressure caused by the deactivating of the priming pump.

2. The apparatus of claim 1, wherein the valve includes a spring, a spool, a fuel line port connected to the second fuel line and a purge port, and wherein the spool is configured to be urged by spring bias of the spring into a closed position that disables fluid communication between the fuel line port and the purge port, and moved by the increased pressure, against the spring bias, into an open position that enables fluid communication between the fuel line port and the purge port.

3. The apparatus of claim 2, wherein the valve includes a bore that extends along an axis, the spool includes a piston that isolates a first section of the bore from an axially-opposite second section of the bore, the spring is in the first section and urges the piston axially toward the second section, and the second section is in fluid communication with the second fuel line.

4. The apparatus of claim 3, wherein the second section is in fluid communication with the fuel line port for the increased pressure in the second fuel line to urge the piston axially toward the first section against the spring bias.

5. A method performed by a fuel line apparatus, the method comprising:

channeling fuel through a first fuel line, from a fuel tank to a priming pump;

channeling the fuel through a second fuel line, from the priming pump to a high pressure pump;

activating the priming pump in response to a fuel sensor in the second fuel line not sensing presence of fuel in the second fuel line, to cause an increased pressure in the second fuel line;

deactivating the priming pump in response to the fuel sensor sensing presence of fuel in the second fuel line, to cause a decreased pressure in the second fuel line;

in response to the increased pressure caused by the activating of the priming pump, a valve, connected to the second fuel line, opening to release air from the second fuel line to outside the apparatus to avoid the air, released by the valve, from entering the high pressure pump, the engine and the fuel tank;

in response to the decreased pressure caused by the deactivating of the priming pump, the valve closing.

6. The method of claim 5, wherein the opening and closing are performed by spring bias of a spring urging a spool in the valve into a closed position that disables fluid communication between the second fuel line and the purge line, and the increased pressure moving the spool, against the spring bias, into an open position that enables fluid communication between second fuel line and the purge line.

7. The method of claim 6, wherein the valve includes a bore that extends along an axis, the spool includes a piston that isolates a first section of the bore from an axially-opposite second section of the bore, the spring is in the first section and urges the piston axially toward the second section, and the second section is in fluid communication with the second fuel line.

8. The method of claim 7, wherein the enabling of the fluid communication between the second fuel line and the purge line is achieved by the increased pressure urging the piston toward the first section against the spring bias.

* * * * *